United States Patent [19]
Ukai

[11] Patent Number: 5,317,459
[45] Date of Patent: May 31, 1994

[54] FLOPPY DISK APPARATUS HAVING POWER-SAVE SYSTEM DURING STANDBY MODE

[75] Inventor: Jun'ichi Ukai, Tokyo, Japan
[73] Assignee: NEC Corporation, Tokyo, Japan
[21] Appl. No.: 730,242
[22] Filed: Jul. 12, 1991
[30] Foreign Application Priority Data
 Jul. 12, 1990 [JP] Japan .................... 2-185018
[51] Int. Cl.⁵ .................. H03K 3/01; G11B 15/18
[52] U.S. Cl. ................... 360/69; 360/71; 307/296.3
[58] Field of Search ............ 307/353, 234, 296.3; 360/69, 71, 75, 137

[56] References Cited
U.S. PATENT DOCUMENTS
4,519,011 5/1985 Bowden ........................ 360/71
4,716,551 12/1987 Inagaki ........................ 307/310

Primary Examiner—William L. Sikes
Assistant Examiner—Toan Tran

[57] ABSTRACT

In a power-save system for a floppy disk apparatus, a latch circuit which is gate-controlled by a trailing-edge delayed standby signal is introduced, whereby it becomes possible to power off sensor circuits contained in the apparatus.

11 Claims, 2 Drawing Sheets

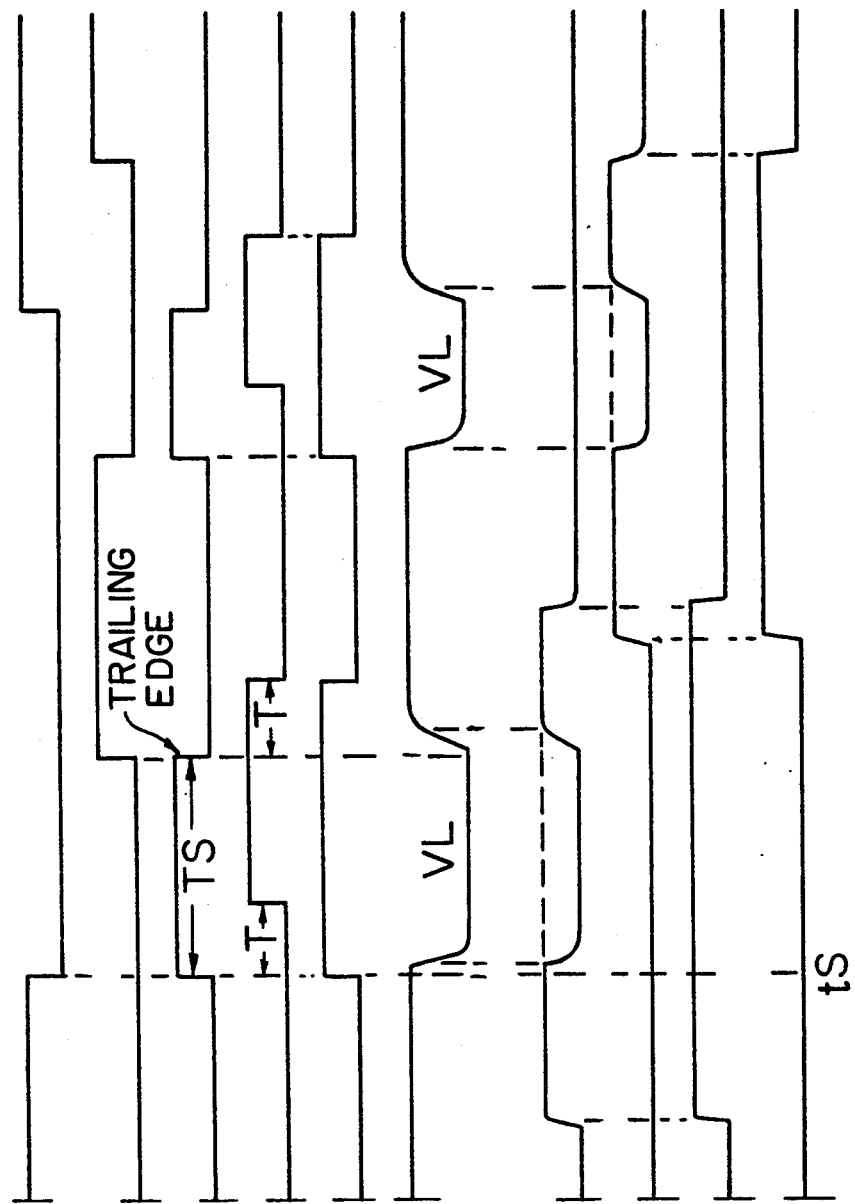

FLOPPY DISK APPARATUS HAVING POWER-SAVE SYSTEM DURING STANDBY MODE

BACKGROUND OF THE INVENTION

1. Field of the Invention

The present invention relates to a floppy disk apparatus, particularly to a floppy disk apparatus having power-save functions.

2. Description of the prior art

Up to the present, various power-save techniques have been developed for a floppy disk apparatus in order to reduce power consumption by the apparatus, for example, effecting a power-off of a read/write circuit when the apparatus is not in a read/write operation mode or effecting an off-control of a motor power source when the apparatus is in a standby mode.

In such prior art techniques, it is possible to reduce power consumption of the apparatus by cut-off of the motor power source or the circuit power source, but it is not possible to cut off a power source for various sensors, particularly a zero-track sensor, a disk-in sensor, etc., since it is essentially necessary for such sensors to retain their output state even during a power-save mode in order to assure their quick and stable response, particularly to avoid any erroneous action of the apparatus owing to any noises which may be generated at on-off operation of their power sources.

SUMMARY OF THE INVENTION

An object of the present invention therefore is to realize a floppy disk apparatus having new means for enabling a power-save function for various sensors provided therein.

The present invention thus provides a floppy disk apparatus comprising:

(a) a logic circuit for detecting a standby mode of the apparatus and generating a standby signal, (b) a power source control circuit for receiving the standby signal as an input signal and controlling a power source of a sensor ciruit in response to the input standby signal, (c) a delay circuit for receiving the standby signal as an input signal, delaying its trailing-edge timing and generating a trailing-edge delayed standby signal, and (d) a latch circuit having an input terminal for receiving a sensor output signal as an input signal, a gate terminal for receiving the trailing-edge delayed standby signal as a gate signal and an output terminal and acting to output the input signal through the latch circuit during when the gate signal is in an inactive state and to output the input signal in a state just before transition of the gate signal from the inactive state to an active state during a period when the gate signal is in the active state.

The above logic circuit may be constituted by a NOR gate having one input terminal for receiving a spindle motor drive signal and the other input terminal for receiving a track seek mode signal.

The above power source control circuit may be constituted by a switching gate controlling connection and disconnection of the sensor circuit to the power source in response to an active state and an inactive state of the standby signal, respectively.

The above delay circuit may be constituted by an OR gate having one input terminal for receiving the standby signal and the other input terminal for receiving the standby signal through a timer circuit with some delay necessary for covering a time required to stabilize an output of the sensor circuit when it is activated and said timer circuit for providing such delay.

The above latch circuit may be constituted by a transparent latch circuit which in itself is known in the art.

BRIEF DESCRIPTION OF THE DRAWINGS

FIG. 2 shows signal wave forms of signals observed at points shown in FIG. 1.

DESCRIPTION OF THE PREFERRED EMBODIMENTS

Figure 1:
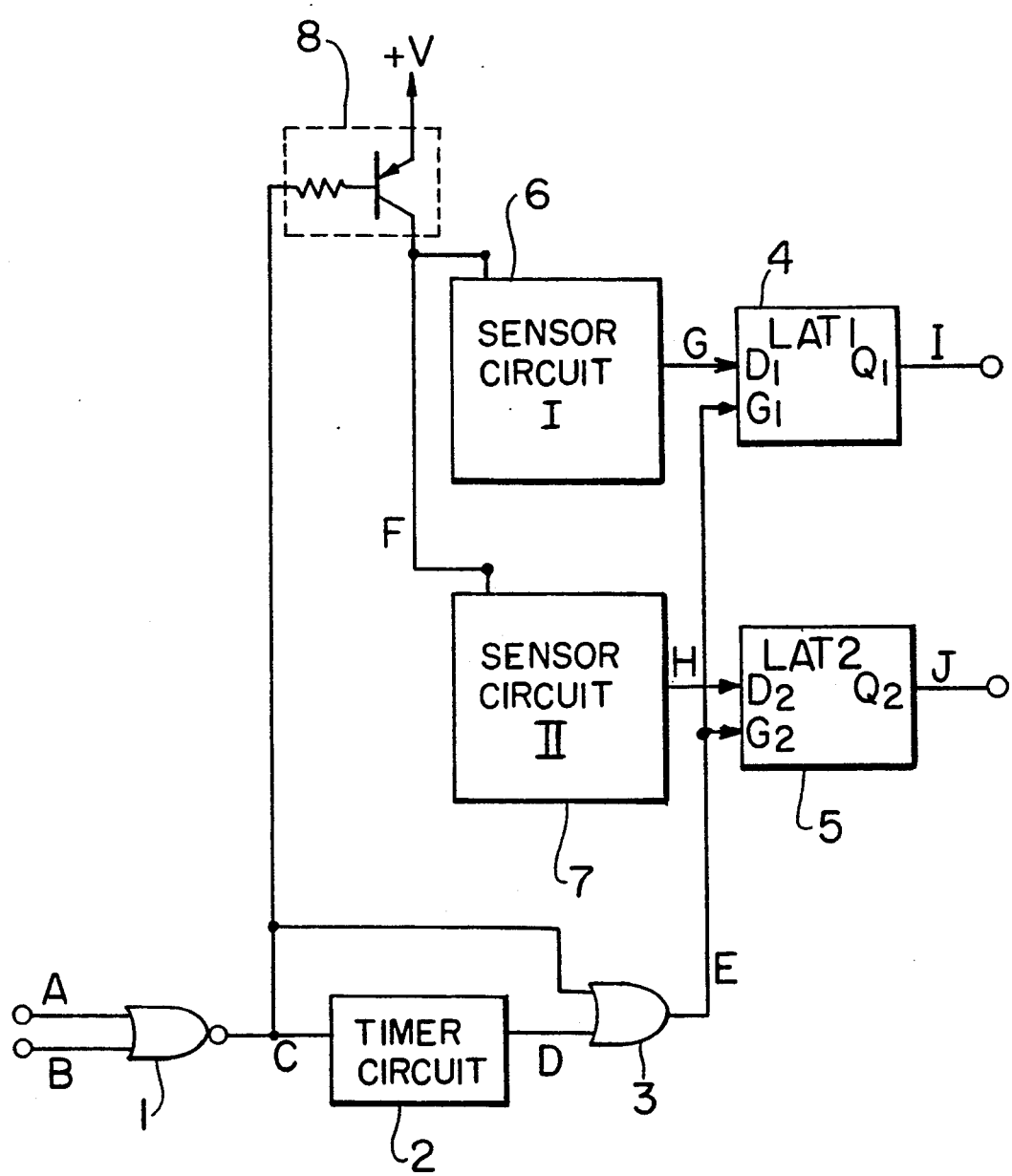
FIG. 1 shows a circuit diagram of a sensor portion of an embodiment of the floppy disk apparatus of the present invention.

The present invention will be explained below further in detail with respect to its embodiment shown in FIGS. 1 and 2.

In this embodiment, a standby mode of a floppy disk apparatus is detected by a NOR gate 1 having one input terminal connected to receive a spindle motor drive signal A and the other input terminal connected to receive a track seek mode signal B. In an output terminal of the NOR gate 1, a standby signal C is generated as an output signal.

The standby signal C output from the NOR gate 1 is transmitted directly to one input terminal of an OR gate 3 and through a timer circuit 2 to the other input terminal of the OR gate 3. The timer circuit 2 delays the input standby signal C for some time necessary for covering a time required to stabilize an output of sensor circuits 6 and 7.

An output signal E of the OR gate 3 is transmitted to gate terminals $G_1$ and $G_2$ respectively of transparent latch circuits 4 and 5 as a gate signal.

The sensor circuits 6 and 7 are of the type having photo interrupter and their power sources are connected to a power source control gate 8 gated by the standby signal C. Output signals G and H respectively of the sensor circuit 6 and 7 are transmitted to input terminals $D_1$ and $D_2$ respectively of the transparent latch circuits 4 and 5 and output from output terminals I and J respectively of the transparent latch circuits 4 and 5 under control by the gate signal E.

Functions of a sensor power-save system constituted by the NOR gate 1, the timer circuit 2, the OR gate 3, the transparent latch circuits 4 and 5 and the power source control gate 8 will further be explained with reference to FIG. 2 showing wave forms of the signals A to J.

The spindle motor drive signal A shows by its high level an active state when a spindle motor of the floppy disk apparatus is driven and by its low level an inactive state when the spindle motor is not driven. Namely, the low level of the spindle motor drive signal A means that the floppy disk apparatus is not in a read/write mode.

The track seek mode signal B shows by its high level that the floppy disk apparatus is in a track seek mode operation and by its low level that the floppy disk apparatus is not in the track seek mode operation.

The standby signal C, that is, the output signal of the NOR gate 1, shows that the floppy disk apparatus is in a standby state from a point ts for a period TS during which the standby signal is at a high level. During the period TS, the floppy disk apparatus is made to stand in a power-save mode and a power source voltage F of the sensors 6 and 7 is switched to a low voltage state VL.

The standby signal C is delayed by the timer circuit 2 for a time period T to obtain a standby delay signal D, which is then combined with the standby signal C by the OR gate 3 to obtain the gate signal E corresponding to the standby signal C, only the trailing edge timing of which is delayed for the time T.

The sensor output signal G of the sensor circuit 6 shows by its high level that the floppy disk apparatus is in a zero track state (and by its low level, not), when the floppy disk apparatus is not in a power-save mode. It is necessary to retain detection of this zero track state even through the power-save mode and this is realized by the output signal I of the transparent latch circuit 4, latched by the gate signal E which covers delayed stabilization of the sensor output signal G after the standby signal C by the merit of the delayed trailing-edge timing.

The sensor output signal H of the sensor circuit 7 shows by its high level that a floppy disk is inserted into the floppy disk apparatus (and by its low level, not), when the floppy disk apparatus is not in a power-save mode. It is also necessary to retain detection of this state even through the power-save mode and this is realized similarly by the output signal J of the transparent latch circuit 5, latched by the gate signal E.

As explained in detail above, it becomes possible due to the present invention to completely retain output signals of various sensors in a floppy disk apparatus even during time periods when power sources of the sensors are switched off in a power-save mode of the apparatus, by introducing a latch circuit which is gate-controlled by a trailing-edge delayed standby signal.

The above described embodiment is only to concretely explain an example of the constitution of the present invention and does not give any limitation to the present invention. For example, the latch circuit to be used in the present invention is not limited to the transparent latch circuit used in the above mentioned embodiment and it is possible to make use of other similar latch circuits either singularly or in combination to obtain the effect of the present invention.

I claim:

1. A floppy disk apparatus comprising:
   a logic circuit for detecting a standby mode of the apparatus and generating a standby signal;
   a sensor circuit;
   a power source control circuit connected to the sensor circuit and receiving the standby signal as an input signal from the logic circuit and controlling a power source of the sensor circuit in response to the input standby signal;
   a delay circuit receiving the standby signal as an input signal from the logic circuit, delaying a trailing-edge timing of said standby signal and generating a trailing-edge delayed standby signal; and
   a latch circuit having an input terminal receiving a sensor output signal as an input signal from the sensor circuit, a gate terminal receiving the trailing-edge delayed standby signal as a gate signal from the delay circuit, and an output terminal, the latch circuit acting to output the sensor output signal processed through the latch circuit during a period when the gate signal is in an inactive state and to output the sensor output signal in a state just before transition of the gate signal from the inactive sate to an active state during a period when the gate signal is in the active state.

2. The floppy disk apparatus according to claim 1, wherein the logic circuit includes a NOR gate having one input terminal for receiving a spindle motor drive signal and another input terminal for receiving a track seek mode signal.

3. The floppy disk apparatus according to claim 1, wherein the power source control circuit includes a switching gate controlling connection and disconnection of the sensor circuit to the power source, respectively in response to an active state and an inactive state of the standby signal, respectively.

4. The floppy disk apparatus according to claim 1, wherein the delay circuit includes an OR gate having one input terminal for receiving the standby signal and another input terminal for receiving the standby signal through a timer circuit with some delay necessary for covering a time period required to stabilize an output of the sensor circuit when it is activated and said timer circuit providing said delay.

5. The floppy disk apparatus according to claim 1, wherein the latch circuit includes a transparent latch circuit.

6. A power-save system for a floppy disk apparatus to enable power-off of sensor circuits of the apparatus, the improvement comprising:
   a logic circuit for detecting a standby mode of the apparatus and generating a standby signal;
   a sensor circuit;
   a power source control circuit connected to the sensor circuit and receiving the standby signal as an input signal from the logic circuit and controlling a power source of the sensor circuit in response to the input standby signal;
   a delay circuit receiving the standby signal as an input signal from the logic circuit, delaying a trailing-edge timing of said standby signal and generating a trailing-edge delayed standby signal; and
   a latch circuit having an input terminal receiving a sensor output signal as an input signal from the sensor circuit, a gate terminal receiving the trailing-edge delayed standby signal as a gate signal from the delay circuit, and an output terminal, the latch circuit acting to output the sensor output signal processed through the latch circuit during a period when the gate signal is in an inactive state and to output the sensor output signal in a state just before transition of the gate signal from the inactive sate to an active state during a period when the gate signal is in the active state.

7. A floppy disk apparatus comprising:
   a logic circuit for detecting a standby mode of the apparatus and generating a standby signal;
   a power source control circuit;
   a first sensor means for detecting a zero track state of the floppy disk apparatus;
   a second sensor means for detecting whether or not a floppy disk is inserted into the floppy disk apparatus;
   said power source control circuit being connected to each sensor and receiving the standby signal as an input signal from the logic circuit and controlling a power source of each sensor in response to the input standby signal;
   a delay circuit receiving the standby signal as an input signal from the logic circuit, delaying a trailing-edge timing of said standby signal and generating a trailing-edge delayed standby signal; and latch means including a first and second latch circuit each having an input terminal receiving an output signal from a respective sensor means as an input signal, a gate terminal receiving the trailing-edge delayed standby signal as a gate signal from the delay circuit and an output terminal, each latch circuit acting to output the output signal of the respective sensor means, processed through said latch circuit during a period when the gate signal is in an inactive state and to output the output signal of the respective sensor means in a state just before transition of the gate signal from the inactive state to an active state during a period when the gate signal is in the active state.

8. The floppy disk apparatus according to claim 7, wherein the circuit includes a NOR gate having one input terminal for receiving a spindle motor drive signal and another input terminal for receiving a track seek mode signal.

9. The floppy disk apparatus according to claim 7, wherein the power source control circuit includes a switching gate controlling connection and disconnection of each sensor means to the power source in response to an active state and an inactive state of the standby signal, respectively.

10. The floppy disk apparatus according to claim 7, wherein the delay circuit includes an OR gate having one input terminal for receiving the standby signal and another input terminal for receiving the standby signal through a timer circuit with some delay necessary for covering a time period required to stabilize an output of the sensor means when it is activated and said timer circuit providing said delay.

11. The floppy disk apparatus according to claim 7, wherein each latch circuit is a transparent latch circuit.

* * * * *